United States Patent
Nelson et al.

(10) Patent No.: US 9,720,453 B2
(45) Date of Patent: Aug. 1, 2017

(54) FABRIC ADHESION TO AN APPARATUS

(71) Applicant: Microsoft Technology Licensing, LLC, Redmond, WA (US)

(72) Inventors: John Jacob Nelson, Cambridge, MA (US); Ivan Andrew McCracken, Seattle, WA (US); David Otto Whitt, III, Redmond, WA (US); Timothy Carlyle Shaw, Sammamish, WA (US); Rahul Marwah, Sammamish, WA (US); Thomas Joseph Longo, Redmond, WA (US); Eugene Lee, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 14/584,777

(22) Filed: Dec. 29, 2014

(65) Prior Publication Data

US 2016/0187933 A1 Jun. 30, 2016

(51) Int. Cl.
*G06F 1/16* (2006.01)
*B32B 7/14* (2006.01)
(Continued)

(52) U.S. Cl.
CPC .............. *G06F 1/1681* (2013.01); *B32B 5/02* (2013.01); *B32B 7/14* (2013.01); *G06F 1/1662* (2013.01);
(Continued)

(58) Field of Classification Search
CPC ........ G06F 1/1681; G06F 1/1662; B32B 5/02
See application file for complete search history.

(56) References Cited

U.S. PATENT DOCUMENTS

| | | |
|---|---|---|
| 3,997,229 A | 12/1976 | Narozny et al. |
| 5,463,794 A | 11/1995 | Erland |

(Continued)

FOREIGN PATENT DOCUMENTS

| | | |
|---|---|---|
| WO | 0188683 A1 | 11/2001 |
| WO | WO-2013102214 | 7/2013 |
| WO | 2014084881 A2 | 6/2014 |

OTHER PUBLICATIONS

"Polypropylene Processing Guide", INEOS—Olefins & Polymers USA. Available at <http://www.ineos.com/Global/Olefins%20and%20Polymers%20USA/Products/Technical%20information/ineos_polypropylene_processing_guide.pdf>, Mar. 2007, 18 pages.

(Continued)

*Primary Examiner* — Hoa C Nguyen
*Assistant Examiner* — Keith Depew

(57) ABSTRACT

Techniques for fabric adhesion to an apparatus are described. According to one or more embodiments, an apparatus is laminated with fabric utilizing one or more fabric layers. In at least some embodiments, multiple adhesive zones are defined on a fabric layer. Each adhesive zone, for instance, has a particular set of properties, such as a particular location on a fabric layer, a particular adhesive thickness, a particular adhesive type, and so forth. In at least some embodiments, different adhesive zones differ from one another based on one or more of their respective properties and thus enable different fabric characteristics to be specified at different adhesive zones.

20 Claims, 13 Drawing Sheets

(51) Int. Cl.
  *B32B 5/02* (2006.01)
  *G06F 3/02* (2006.01)
(52) U.S. Cl.
  CPC ........ *G06F 3/0202* (2013.01); *B32B 2457/00* (2013.01); *H01H 2203/0085* (2013.01)

(56) References Cited

U.S. PATENT DOCUMENTS

| | | | |
|---|---|---|---|
| 7,685,676 B2 | 3/2010 | Mc Clellan | |
| 7,834,451 B2 | 11/2010 | Lee et al. | |
| 8,498,100 B1* | 7/2013 | Whitt, III | G06F 1/1618 |
| | | | 361/679.17 |
| 8,787,016 B2 | 7/2014 | Rothkopf et al. | |
| 8,896,993 B2* | 11/2014 | Belesiu | G06F 1/1618 |
| | | | 248/231.41 |
| 2002/0134828 A1* | 9/2002 | Sandbach | G06F 1/1632 |
| | | | 235/60.12 |
| 2010/0205777 A1 | 8/2010 | Kim | |
| 2010/0206614 A1* | 8/2010 | Park | H01H 13/88 |
| | | | 174/126.1 |
| 2013/0227836 A1* | 9/2013 | Whitt, III | H01H 13/704 |
| | | | 29/622 |
| 2013/0229758 A1* | 9/2013 | Belesiu | G06F 1/1618 |
| | | | 361/679.08 |
| 2013/0229759 A1 | 9/2013 | Whitt, III et al. | |
| 2014/0132550 A1* | 5/2014 | McCracken | G06F 1/1684 |
| | | | 345/173 |
| 2014/0185215 A1* | 7/2014 | Whitt, III | G06F 1/16 |
| | | | 361/679.4 |
| 2014/0185220 A1* | 7/2014 | Whitt, III | G06F 1/1669 |
| | | | 361/679.17 |
| 2014/0272245 A1 | 9/2014 | Livingston-Peters et al. | |

OTHER PUBLICATIONS

Rho, et al.,' "Fabrication and Reliability of Rigid-Flexible Optical Electrical Printed Circuit Board for Mobile Devices", In IEEE Photonics Technology Letters, vol. 20, No. 12, Jun. 15, 2008, pp. 964-966.

"International Search Report & Written Opinion Issued in PCT Application No. PCT/US2015/064169", Mailed Date: Mar. 10, 2016, 15 Pages.

"Second Written Opinion", Application No. PCT/US2015/064169, Nov. 17, 2016, 6 pages.

\* cited by examiner

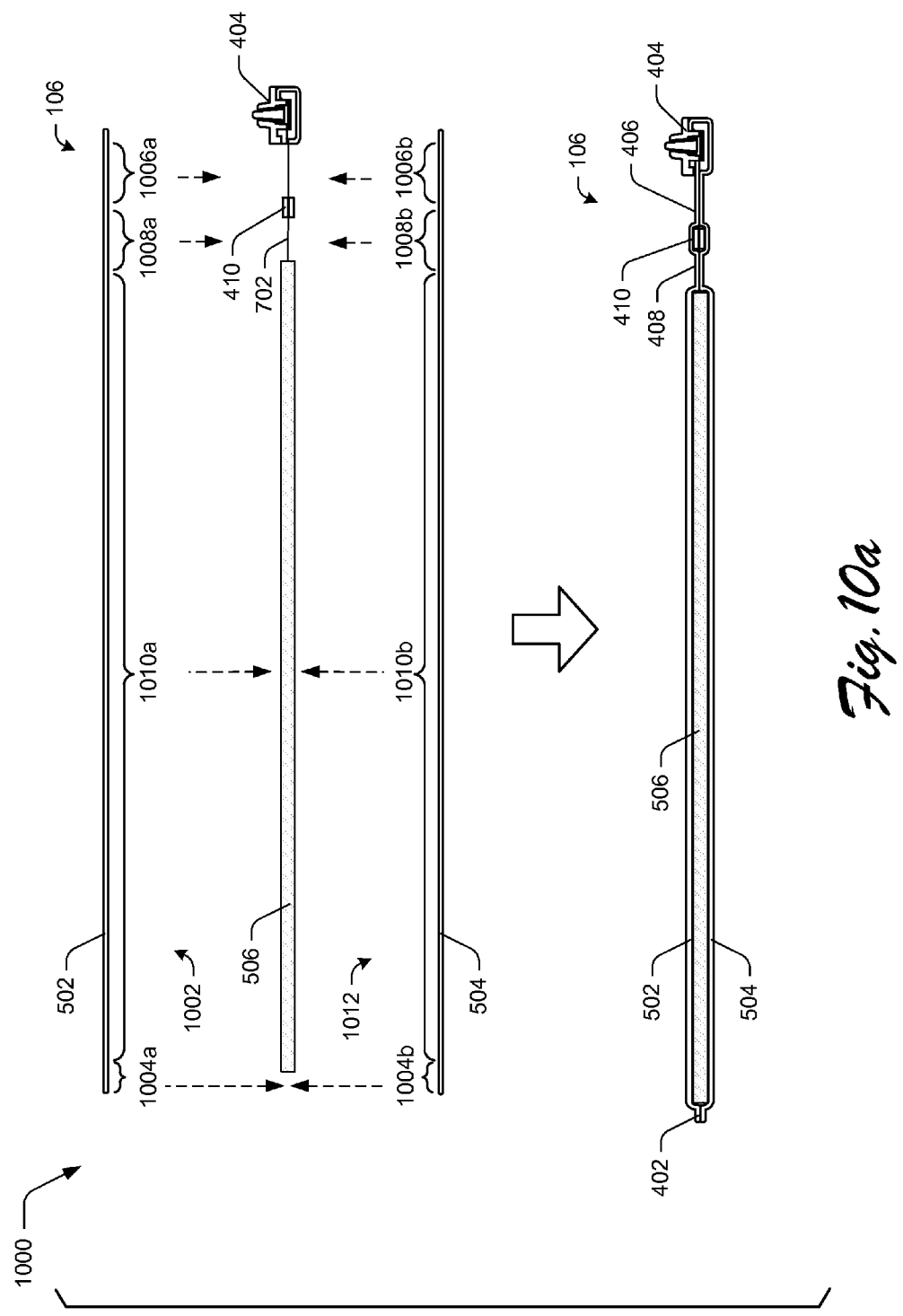

FABRIC ADHESION TO AN APPARATUS

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 10a depicts an example implementation scenario for assembling various portions of an input device in accordance with one or more embodiments.

DETAILED DESCRIPTION

Overview

Figure 1:
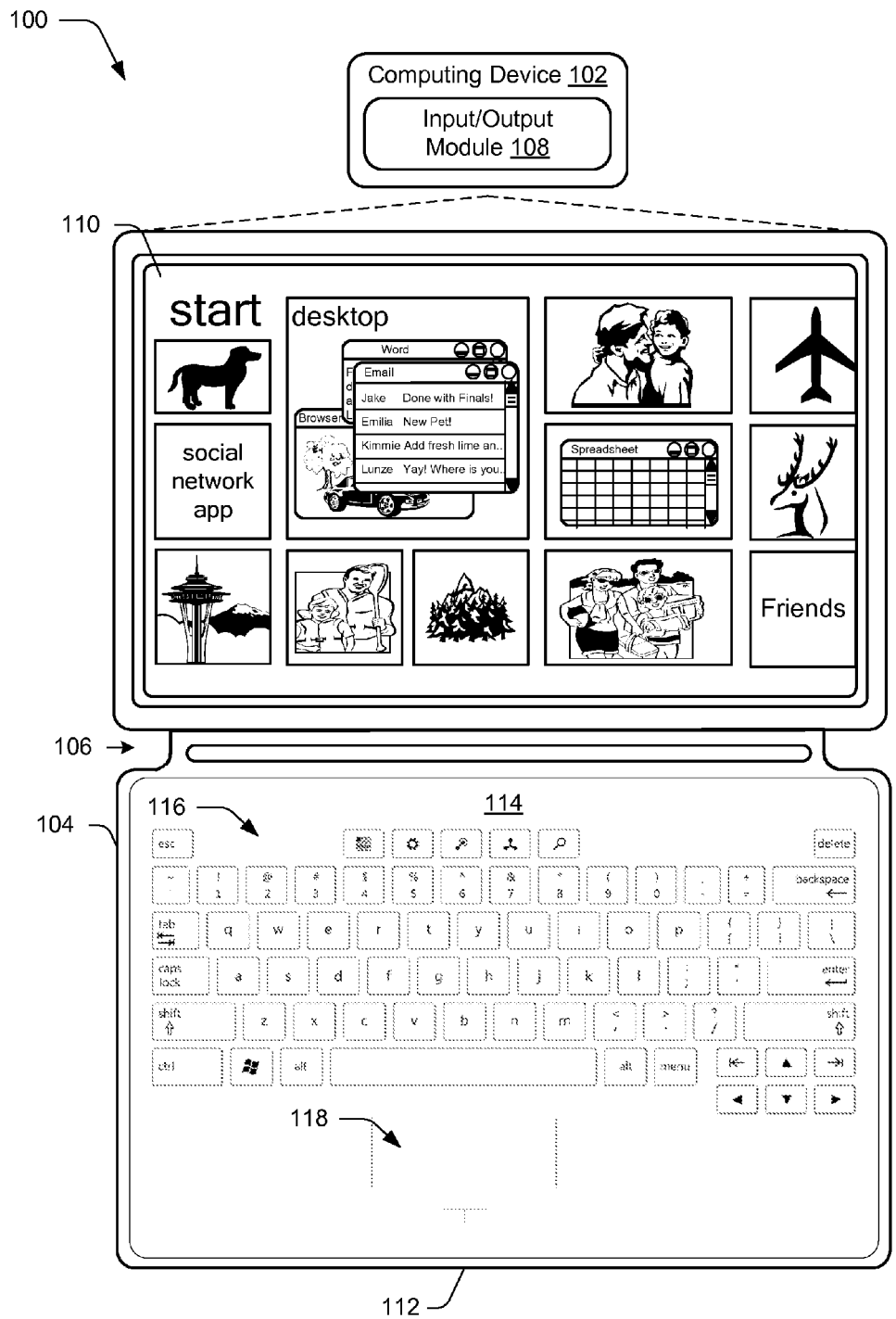
FIG. 1 depicts an example environment that is operable to employ techniques described herein in accordance with one or more embodiments.

Devices today are manufactured according to a variety of different form factors. For example, a user may interact with a mobile phone, tablet computer, a wearable device, or other computing device to check email, surf the web, compose texts, interact with applications, and so on. Further, devices are increasingly designed to reduce their size and weight. Such size and weight reduction, however, presents challenges in maintaining usability and durability of devices, and particularly mobile devices.

Techniques for fabric adhesion to an apparatus are described. According to various implementations, an apparatus is laminated with fabric utilizing one or more fabric layers. Examples of such an apparatus include a computing device, an input device, a wearable device, and so forth. Further to techniques discussed herein, multiple adhesive zones are defined on a fabric layer. Each adhesive zone has a particular set of properties, such as a particular location on a fabric layer, a particular adhesive thickness, a particular adhesive type, and so forth. In at least some implementations, different adhesive zones differ from one another based on one or more of their respective properties.

For instance, a fabric layer may include a first adhesive zone with a particular adhesive thickness, and a second adhesive zone with a different adhesive thickness. Consider, for example, an input device such as a keyboard that is flexibly connected to a computing device such that the input device can be rotated to various positions relative to the computing device. Consider further that the input device is laminated with a fabric layer. The fabric layer is laminated to a periphery of the input device via first adhesive zone that includes a particular thickness of adhesive configured to increase durability of the fabric layer at the periphery. For instance, thickness of an adhesive layer at the first adhesive zone is designed to mitigate peeling and delamination of the fabric layer at the periphery of the input device.

Consider further that the fabric layer is laminated via a second adhesive zone to a flexible hinge portion of the input device. The second adhesive zone is configured to promote flexibility of the flexible hinge to enable the input device to be positioned at various orientations relative to an attached computing device. For instance, thickness of an adhesive layer at the second adhesive zone is less than the adhesive thickness at the first adhesive zone to decrease resistance to flexing at the flexible hinge.

Additionally or alternatively, a different adhesive type is utilized at the second adhesive zone than at the first adhesive zone. For instance, an adhesive utilized at the first adhesive zone may be selected based on its durability characteristics, whereas an adhesive utilized at the second adhesive zone may be selected based on its flexibility characteristics. Thus, embodiments discussed herein enable multiple adhesive zones to be defined on a portion of fabric (e.g., a single integrated sheet of fabric) to enable performance characteristics of the portion of fabric to be tuned and/or customized at different physical regions of the fabric.

Generally, lamination of fabric to an apparatus enhances a user experience in a variety of ways. For instance, consider a device that is used in mobile scenarios, such as a tablet computer, a smartphone, a wearable device, and so forth. Typically, a chassis of such a device is fabricated from a rigid material, such as metal, metal alloys, plastic, and so forth. Laminating the chassis with fabric enables a more comfortable tactile user experience than a metallic or plastic material. Further, fabric may be less slippery and thus reduce the likelihood that a device will slip from a user's hand and be dropped.

Fabric lamination may also dampen vibration of components of an apparatus. For instance, fabric may absorb and/or disperse vibrations, such as during movement of a moveable component. This can reduce noise caused by vibrations that may occur during movement of a moveable component, and may also decrease user annoyance and discomfort that may result from physically perceptible vibrations.

Fabric may also aid in heat dissipation. For instance, electrical devices often produce heat, such as from operation of various electrical components. Thus, a fabric layer may absorb heat and enable heat to be dissipated over a larger surface, thus reducing hotspots and aiding in device cooling.

In the following discussion, an example environment is first described that may employ the techniques described herein. Implementations discussed herein, however, are not limited to the example environment. Next, a section titled "Example Orientations" describes some example device orientations in accordance with one or more implementations. Following this, a section titled "Example Implementations" describes example implementation scenarios for fabric adhesion to an apparatus in accordance with one or more implementations. Next, a section entitled "Example Procedure" describes an example procedure for laminating a fabric layer with multiple adhesive zones in accordance with one or more embodiments. Finally, an example system and device are discussed that may implement various techniques described herein.

Example Environment

FIG. 1 is an illustration of an environment 100 in an example implementation that is operable to employ techniques for fabric adhesion to an apparatus described herein. The illustrated environment 100 includes an example of a computing device 102 that is physically and communicatively coupled to an input device 104 via a flexible hinge 106. In this particular example, the computing device 102 is configured as a tablet computing device. This is not intended to be limiting, however, and the computing device 102 may be configured in a variety of other ways, such as a mobile phone, a wearable device, a laptop, a gaming apparatus, and so on. Thus, the computing device 102 may range from full resource devices with substantial memory and processor resources, to a low-resource device with limited memory and/or processing resources. An example implementation of the computing device 102 is discussed below with reference to FIG. 13.

The computing device 102 is illustrated as including an input/output module 108, which is representative of functionality relating to processing of inputs and rendering outputs of the computing device 102. A variety of different inputs may be processed by the input/output module 108, such as inputs relating to functions that correspond to keys of the input device 104, keys of a virtual keyboard displayed by a display device 110 to identify touch gestures and cause operations to be performed that correspond to the touch gestures that may be recognized through the input device 104 and/or touchscreen functionality of the display device 110, and so forth. Thus, the input/output module 108 may support a variety of different input techniques by recognizing and leveraging a division between types of inputs including key presses, touch gestures, touchless gestures recognized via a camera functionality of the computing device 102, and so on.

In the illustrated example, the input device 104 is configured as having a chassis 112 with a top surface 114. The top surface 114 includes input portions that include a keyboard 116 having an arrangement of keys and a touch input device 118. The example arrangement is presented for purpose of example only, and other arrangements and positions for the keyboard 116 and the touch input device 118 are also contemplated. Further, other non-conventional configurations are also contemplated, such as a game controller, configuration to mimic a musical instrument, and so forth. Thus, the input device 104, the keyboard 116, and/or the touch input device 118 may assume a variety of different configurations to support a variety of different functionality.

According to various implementations, the input device 104 is manufactured from a particular material, such as instances and/or combinations of plastic, metal, various alloys, carbon fiber, and so forth. Further, various portions of the top surface 114 and/or other surfaces of the input device 104 are laminated with a fabric layer. In at least some implementations, the entire top surface 114 is laminated with a fabric layer that covers the keyboard 116 and the touch input device 118. The fabric, for instance, may be a continuous sheet of fabric that is laminated to cover the top surface 114. According to one or more implementations, the fabric may include multiple individual layers of fabric material(s) that are laminated together to form an integrated fabric layer.

Examples of materials that may be used for the fabric layer include fabrics made from natural materials (e.g., cotton, silk, wool, leather, linen, and so forth), fabrics made from synthetic materials (e.g., nylon, polyester, aramid, carbon fiber, and so forth), and combinations thereof. These examples are not to be construed as limiting, and a variety of other types and instances of fabrics may be employed in accordance with the claimed implementations. Generally, a fabric layer represents a layer of flexible material that may be formed from a particular type and/or combination of materials.

According to various implementations, the keys of the keyboard 116 include key visualizations that are visual representations of keys that are printed and/or etched on the fabric layer of the top surface 114. Beneath the fabric layer is a sensor substrate that includes a plurality of pressure sensitive keys. For instance, individual of the key visualizations identify a location of a corresponding pressure sensitive key that is beneath the fabric layer. Thus, the key visualizations enable a user to locate and actuate the appropriate pressure sensitive keys by pressing on the corresponding regions of the fabric layer.

In one or more implementations, the touch input device 118 is mounted to the input device 104 beneath the fabric layer and can receive user input, such as via capacitive or other sensors that are configured to detect physical touch.

As previously described, the input device 104 is physically and communicatively coupled to the computing device 102 in this example through use of a flexible hinge 106. The flexible hinge 106 is flexible in that rotational movement supported by the hinge is achieved through flexing (e.g., bending) of the material forming the hinge as opposed to mechanical rotation as supported by a pin, although that implementation is also contemplated. Further, such flexible rotation may be configured to support movement in one or more directions (e.g., vertically in the figure) yet restrict movement in other directions, such as lateral movement of the input device 104 in relation to the computing device 102. This may be used to support consistent alignment of the input device 104 in relation to the computing device 102, such as to align sensors used to change power states, application states, and so on.

It is to be appreciated that the various devices and components illustrated in the accompanying drawings are not necessarily illustrated to scale. Thus, the various dimensions, positional relationships, and/or operational relationships between the different devices and components illustrated in the accompanying drawings are not to be construed as limiting on the claimed embodiments.

Having introduced the computing device 102 and the input device 104, consider now a discussion of some example orientations of the computing device 102 and the input device 104 in accordance with one or more implementations.

Example Orientations

Figure 2:
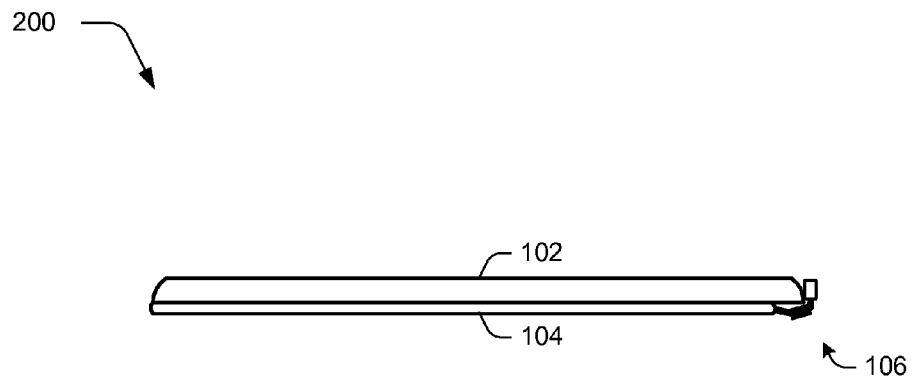
FIG. 2 depicts an example orientation of an input device relative to a computing device in accordance with one or more embodiments.

According to various embodiments, a variety of different orientations of the computing device 102 and the input device 104 are supported. For example, rotational movement may be supported by the flexible hinge 106 such that the input device 104 may be placed against the display device 110 of the computing device 102 and thereby act as a cover as shown in the example orientation 200 of FIG. 2. Thus, the input device 104 may act to protect the display device 110 of the computing device 102 from harm.

Figure 3:
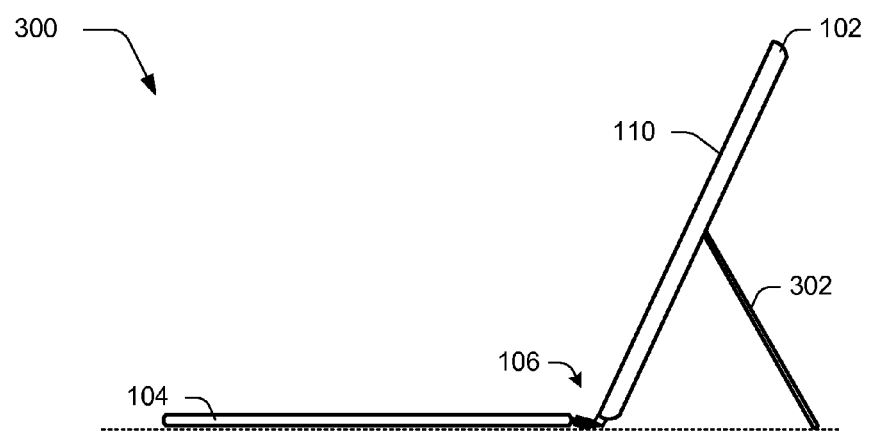
FIG. 3 depicts an example orientation a support component in an open position in accordance with one or more embodiments.

As shown in the example orientation 300 of FIG. 3, a typing arrangement may be supported. In this orientation, the input device 104 is laid flat against a surface and the computing device 102 is disposed at an angle to permit viewing of the display device 110, e.g., such as through use of a kickstand 302 disposed on a rear surface of the computing device 102. Generally, the kickstand 302 represents a support component that enables a variety of different orientations for the computing device 102. The kickstand 302, for instance, is rotatably attached to the computing device 102 to enable the kickstand 302, and thus the computing device 102, to assume a variety of different orientations such that different operating scenarios are supported. Alternatively or additionally, a friction hinge may be employed to hold the keyboard and the tablet in place with respect to one another such as in a laptop configuration. Naturally, a variety of other orientations other than those expressly illustrated and discussed herein are also supported.

Example Implementations

This section discusses some example implementations for fabric adhesion to an apparatus in accordance with one or more implementations.

Figure 4:
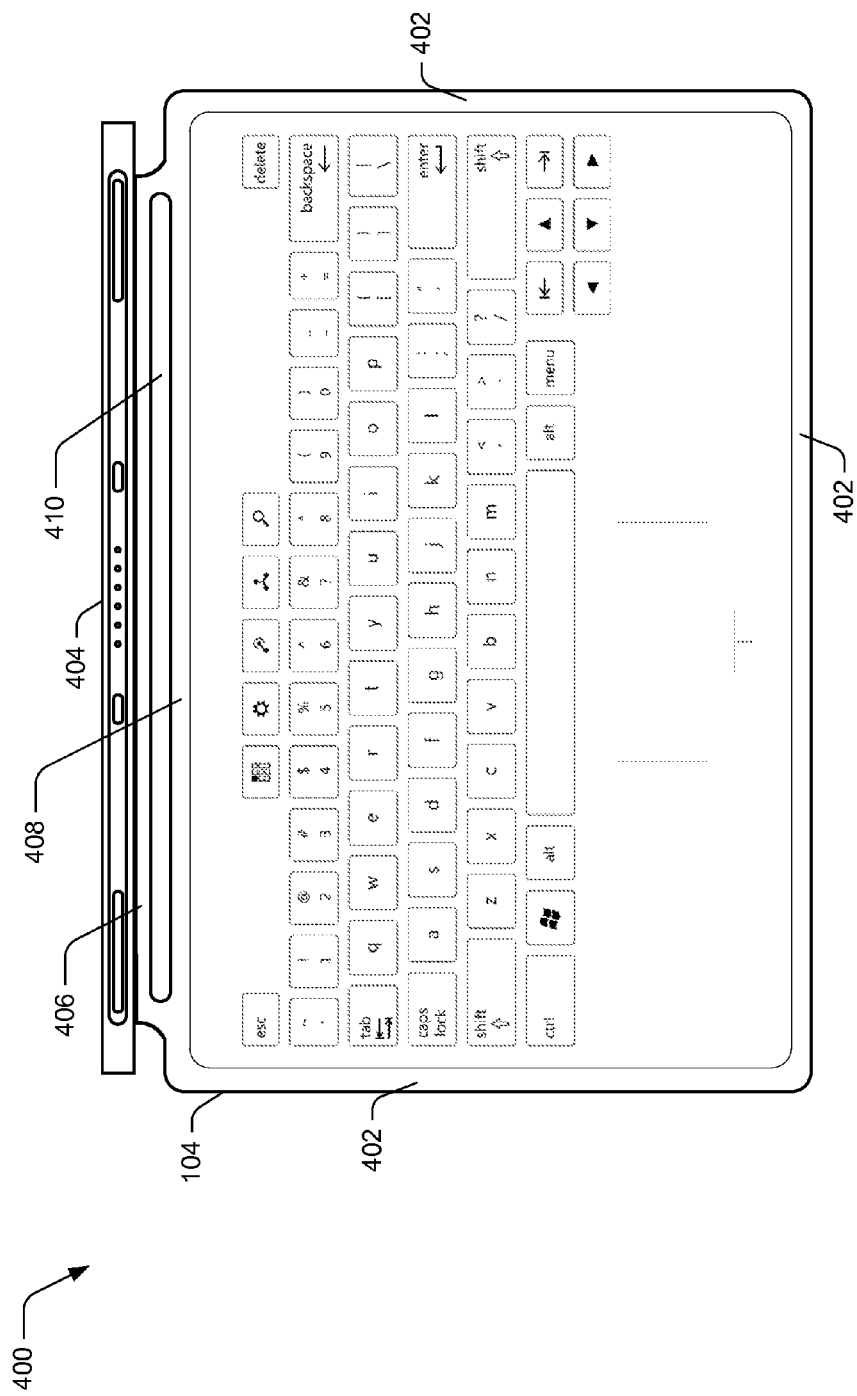
FIG. 4 depicts a top view of an input device in accordance with one or more embodiments.

FIG. 4 illustrates a top view 400 of the input device 104 detached from the computing device 102. The input device 104 includes a peripheral edge 402 that represents an external edge of the input device 104. In this particular example, the peripheral edge 402 surrounds the input device 104 on at least three sides. The input device 104 further includes a connector 404 that enables the input device 104 to be connected to the computing device 102. In at least some implementations, the connector 404 enables detachable connection of the input device 104 to the computing device 102, such as using magnets, clips, plugs, latches, and/or other suitable detachable attachment technique.

While the connector 404 is illustrated herein as enabling physical attachment of the input device 104 to the computing device 102, it is to be appreciated that other alternative or additional implementations are contemplated. For instance, the connector 404 may enable wireless communication of data between the input device 104 and the computing device 102. For instance, as an addition or alternative to a physical connection, the connector 404 may be implemented as a wireless functionality for wireless data communication, such as a wireless transceiver. Accordingly, the connector 404 generally represents an interface between the input device 104 and the computing device 102.

The flexible hinge 106 of the input device 104 includes a first hinge region 406 and a second hinge region 408 with a spine 410 therebetween. Generally, the first hinge region 406 and the second hinge region 408 represent flexible portions of the flexible hinge 106 that enable rotation of the input device 104 relative to an attached device, such as the computing device 102. The spine 410 represents a stiff portion of the flexible hinge 106 that enables flexibility of the flexible hinge 106 to be controlled, e.g., tuned to a particular stiffness and/or motion profile.

Figure 5:
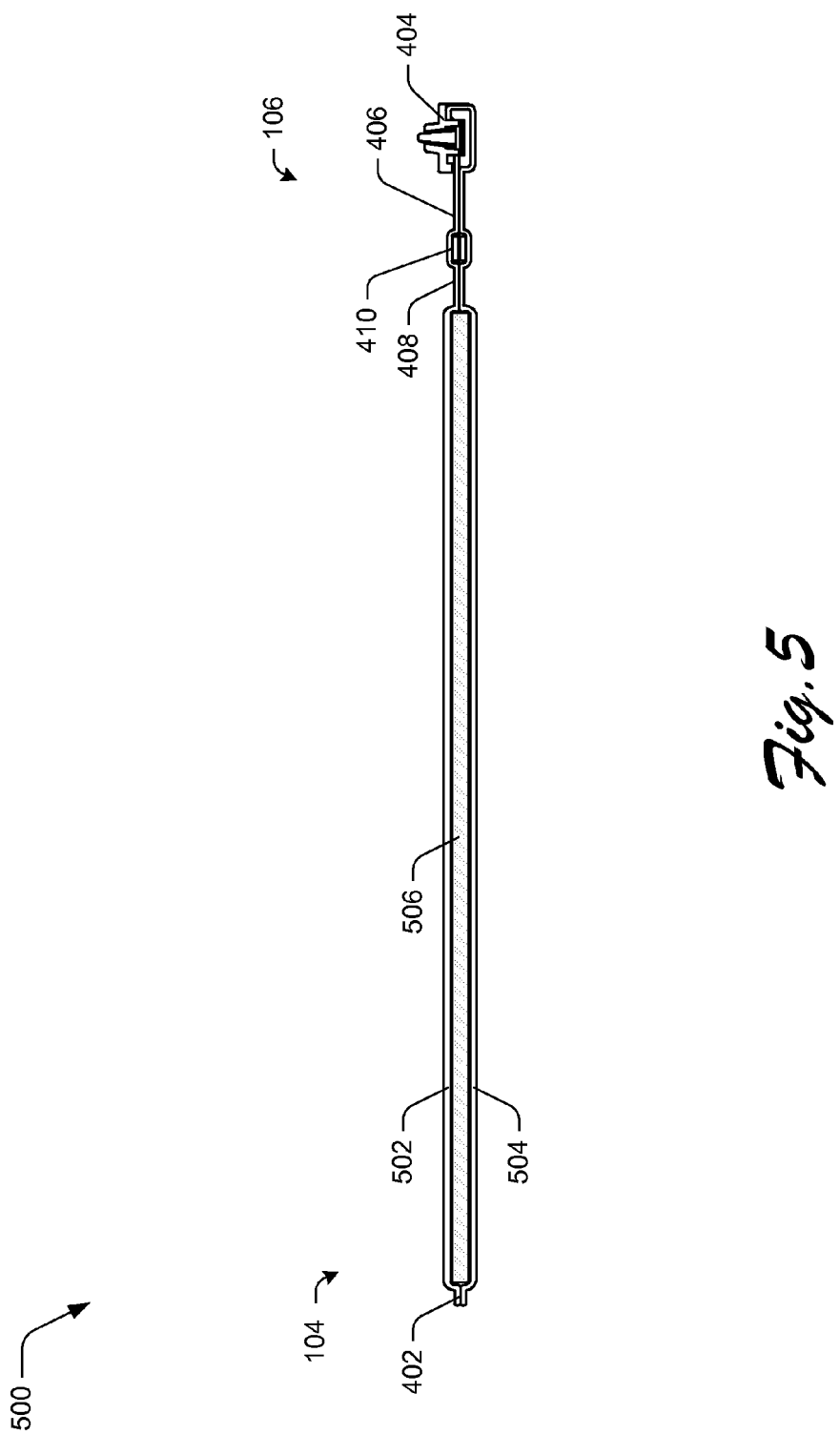
FIG. 5 depicts a side cross section view of an input device in accordance with one or more embodiments.

FIG. 5 illustrates a side cross section view 500 of the input device 104 in accordance with one or more implementations. The section view 500 illustrates that the input device 104 is laminated with a top fabric layer 502 and a bottom fabric layer 504. Generally, the top fabric layer 502 and the bottom fabric layer 504 represent different layers of fabric that are laminated over internal components 506 of the input device 104. The internal components 506 represent internal input components that enable various types of input to be detected by the input device 104. The internal components 506, for instance, include a printed circuit board (PCB) with various electrical components attached thereto, such as components of the keyboard 116, the touch input device 118, and so forth. The top fabric layer 502 and the bottom fabric layer 504 may be laminated to the internal components 506 using any suitable lamination and/or adhesive technique.

The section view 500 further illustrates the flexible hinge 106 with the first hinge region 406 and the second hinge region 408, and the spine 410 therebetween. Notice that in this particular example, the first hinge region 406 and the second hinge region 408 are formed from adhesion of the top fabric layer 502 at least partially to the bottom fabric layer 504. Further, the spine 410 represents a material inserted between the top fabric layer 502 to the bottom fabric layer 504 and that at least partially separates the first hinge region 406 and the second hinge region 408.

The connector 404 is also illustrated. As referenced above, the connector 404 provides mechanical and/or electrical connectivity between the input device 104 and the computing device 102.

Further illustrated is a cross section of the peripheral edge 402. Generally, the peripheral edge 402 represents an external edge of the top fabric layer 502 that is adhered to an external edge of the bottom fabric layer 504. For instance, the surface area of the top fabric layer 502 and the surface area of the bottom fabric layer 504 are larger than the surface area of the internal components 506 such that the respective fabric layers overlap beyond the outer edges of the internal components 506. As further detailed below, adhesion of the top fabric layer 502 to the bottom fabric layer 504 along the peripheral edge 402 may utilize a thicker adhesive layer than other portions of the fabric layers, such as to increase durability of the bond between the respective fabric layers along the peripheral edge 402.

Figure 6:
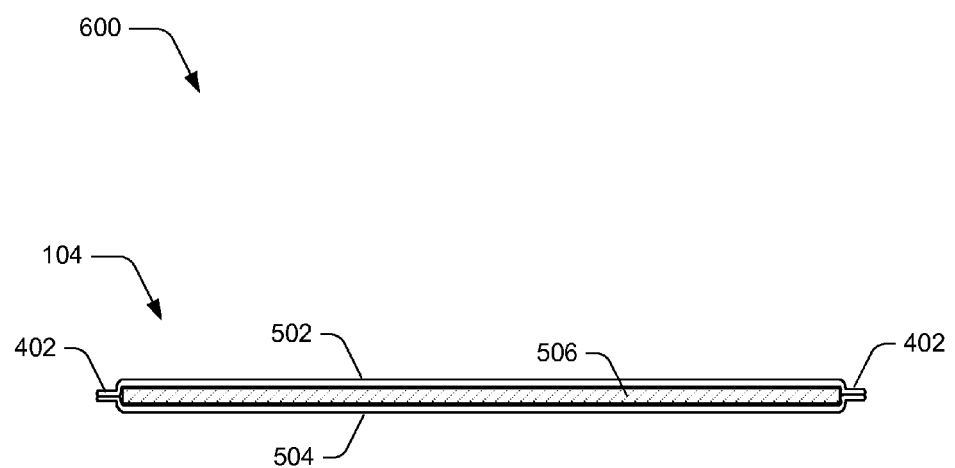
FIG. 6 depicts a front cross section view of an input device in accordance with one or more embodiments.

FIG. 6 illustrates a front cross section view 600 of the input device 104 in accordance with one or more implementations. The section view 600 illustrates the top fabric layer 502 and the bottom fabric layer 504 laminated to the internal components 506. Further depicted are different sides of the peripheral edge 402 that are positioned along opposite sides of the input device 104. Among other things, the section view 600 serves to illustrate that the top fabric layer 502 and the bottom fabric layer 504 overlap the internal components 506 and are adhered to one another along the external edges of the input device 104.

Figure 7:
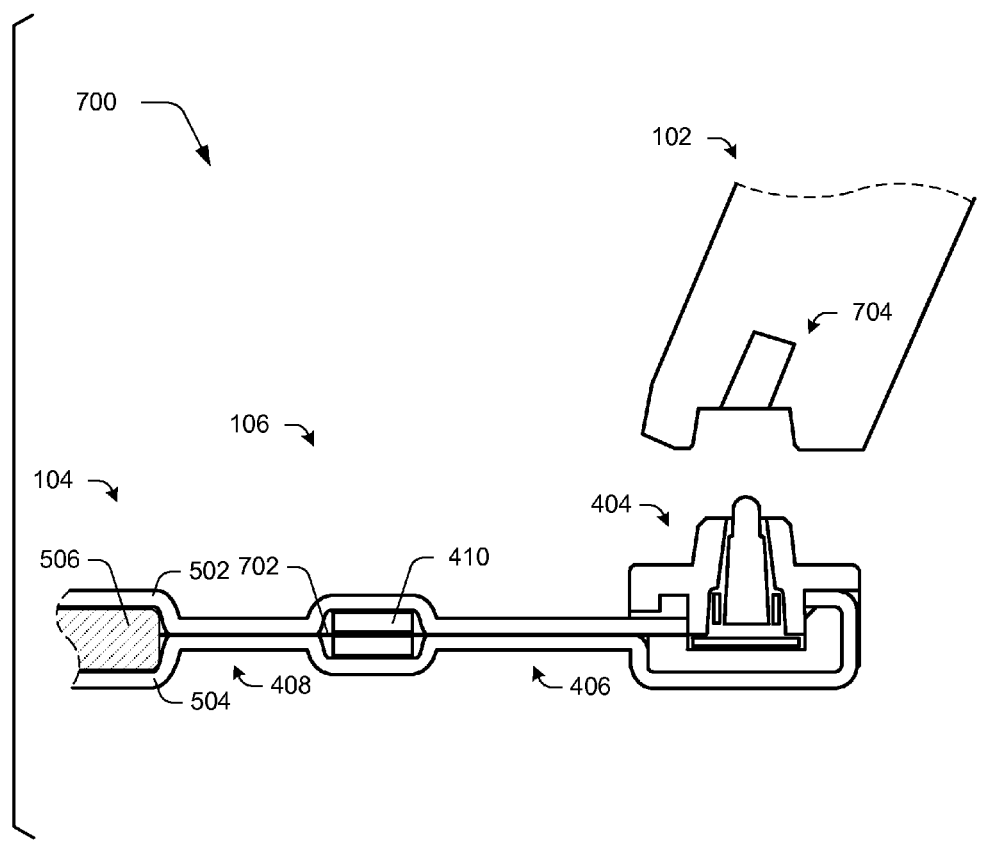
FIG. 7 depicts a partial side cross section view of a computing device and an input device in accordance with one or more embodiments.

FIG. 7 illustrates a partial side cross section view 700 of the computing device 102 and the input device 104 in accordance with one or more implementations. In the section view 700, the input device 104 is detached from the computing device 102.

The section view 700 depicts the top fabric layer 502 and the bottom fabric layer 504 across the flexible hinge 106 and laminated to opposite sides of the internal components 506 and the spine 410. The top fabric layer 502 and the bottom fabric layer 504 are also laminated at least partially to each other across the first hinge region 406 and the second hinge region 408.

The section view 700 further illustrates the connector 404 which is electrically connected to the internal components 506 via an electrical connection 702. Generally, the electrical connection 702 enables electrical signals to be conducted between the internal components 506 and the connector 404. The electrical connection 702 may be implemented in various ways, such as wire traces and/or other electrically conductive material that is routed from the internal components 506 through the second hinge region 408, the spine 410, and the first hinge region 406 to the connector 404.

According to various implementations, the electrical connection 702 does not span the width of the flexible hinge 106, but is routed through a portion and/or portions of the flexible hinge 106. Thus, the flexible hinge 106 generally includes portions where the top fabric layer 502 and the bottom fabric layer 504 are laminated over the electrical connection 702, and portions where the top fabric layer 502 and the bottom fabric layer 504 are laminated to one another.

According to various implementations, the connector 404 is connectable to the computing device 102 via engagement with a receiver 704 of the computing device 102. Generally, the receiver 704 is configured to receive the connector 404 to enable detachable connection of the input device 104 to the computing device 102. The receiver 704 is further configured to electrically connect with the connector 404 such that electrical signals are routed between the internal components 506 of the input device 104, and components of the computing device 102. For instance, input detected by the internal components 506 of the input device 104 is routed via the electrical connection 702 to the connector 404 and then across the receiver 704 to components of the computing device 102.

Figure 8:
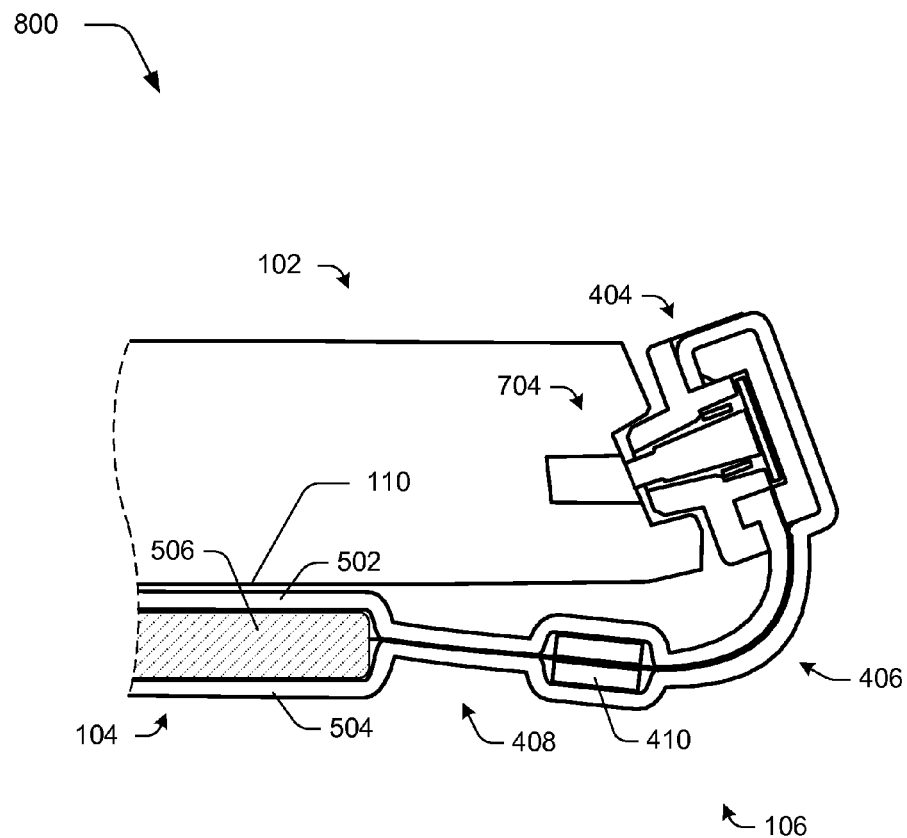
FIG. 8 depicts a partial side cross section view of a computing device and an input device in accordance with one or more embodiments.

FIG. 8 illustrates a partial side cross section view 800 of the computing device 102 and the input device 104 in accordance with one or more implementations. In the section view 800, the input device 104 is attached to the computing device 102. The connector 404, for instance, is connected to the receiver 704. In at least some implementations, the section view 800 represents a detailed illustration of the orientation 200 illustrated in FIG. 2. For instance, the section view 800 illustrates the input device 104 positioned against the display 110 of the computing device 102.

The section view 800 depicts the top fabric layer 502 and the bottom fabric layer 504 across the flexible hinge 106 and laminated to opposite sides of the internal components 506 and the spine 410. The top fabric layer 502 and the bottom fabric layer 504 are also laminated at least partially to each other across the first hinge region 406 and the second hinge region 408.

As illustrated in this particular arrangement, the flexible hinge 106 flexes to enable the input device 104 to be moved to various positions in relation to the computing device 102, such as positioned against the computing device 102. For instance, flexing of the first hinge region 406 and the second hinge region 408 enables the connector 404 to remain engaged with the receiver 704 while the input device 104 is rotated to different positions relative to the computing device 102.

In at least some implementations, the first hinge region 406 and the second hinge region 406 are more flexible than other portions of the input device 104, and thus exhibit less resistance to bending than other portions of the input device 104. As further detailed below, such increased flexibility may be achieved by varying an amount and/or arrangement of adhesive used to bond the top fabric layer 502 to the bottom fabric layer 504 at various regions of the input device 104.

Although the input device 104 is illustrated as being physically coupled to the computing device 102, it is to be appreciated that implementations discussed herein may be employed for wireless connectivity of the input device 104 to the computing device 102, e.g., independent of a physical connection between the input device 104 and the computing device 102. For instance, the input device 104 and the computing device 102 may communicate data via a wireless connection, such as via Bluetooth, WiFi Direct, near field communication (NFC), and so forth. Thus, in at least some implementations, the input device 104 may provide input functionality to a variety of different computing devices independent of a physical connection to the computing devices.

Figure 9:
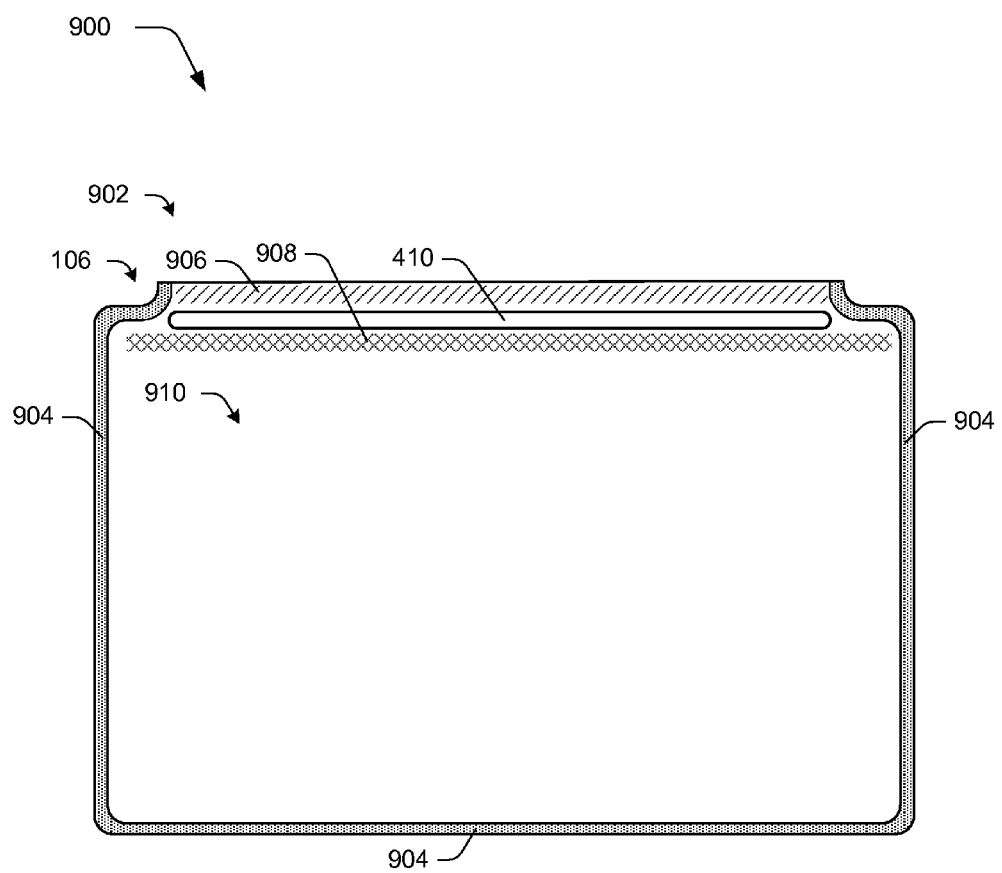
FIG. 9 depicts an inside view of a fabric layer in accordance with one or more embodiments.

FIG. 9 illustrates an inside view 900 of a fabric layer 902 in accordance with one more implementations. The fabric layer 902, for instance, represents one or more of the top fabric layer 502 and/or the bottom fabric layer 504, such as prior to being laminated as part of assembly of the input device 104.

The fabric layer 902 includes a first adhesive zone 904, a second adhesive zone 906, a third adhesive zone 908, and a fourth adhesive zone 910. Generally, the different adhesive zones correspond to different portions of the fabric layer 902 where adhesive thicknesses and/or different adhesive types are utilized to achieve different performance attributes, such as different stiffness and/or flexibility profiles.

The first adhesive zone 904, for instance, corresponds to a portion of the fabric layer 902 where adhesive is applied to enable the peripheral edge 402 of the input device 104 to be assembled. Notice that the first adhesive zone 904 extends around the peripheral edges of the fabric layer 902 except for the edge defined by the adhesive zone 906. Thus, when another fabric layer is assembled to the fabric layer 902, the peripheral edges of the fabric layers are adhered via adhesive situated in the first adhesive zone 904, thus forming the peripheral edge 402 of the input device 104.

According to various implementations, adhesive placed within the adhesive zone 904 is thicker than adhesive in other adhesive zones of the fabric layer 902. Placing a thicker adhesive layer in the adhesive zone 904 provides stiffness and durability to the peripheral edge 402 of the input device 104. For instance, increasing the thickness of the adhesive in the adhesive zone 904 mitigates delamination and peeling of the different fabric layers from one another along the peripheral edge 402.

The second adhesive zone 906 generally coincides positionally with the first hinge region 406 of the flexible hinge 106, and the third adhesive zone 908 generally coincides positionally with the second hinge region 408 of the flexible hinge 106. According to various implementations, adhesive thickness in the second adhesive zone 906 and the third adhesive zone 908 is thinner than adhesive thickness in the first adhesive zone 904. Utilizing a thinner adhesive layer in the second adhesive zone 906 and the third adhesive zone 908 enables the first hinge region 406 and the second hinge region 408 to remain flexible when the fabric layer 902 is adhered to another respective fabric layer. For instance, placing a thin layer of adhesive in the second adhesive zone 906 and the third adhesive zone 908 promotes flexibility of the flexible hinge 106. As referenced above, when the input device 104 is attached to the computing device 102, flexibility of the flexible hinge 106 enables the input device 104 to be rotated to different positions relative to the computing device 102.

Further illustrated is the spine 410 adhered to the fabric layer 902 between the second adhesive zone 906 and the third adhesive zone 908. Generally, the spine is formed from a stiff material such as plastic, metal, carbon fiber, and so forth. The spine 410 provides for stiffening of the flexible hinge 106 to reduce excessive flexibility (e.g., floppiness) of the flexible hinge 106.

The fourth adhesive zone 910 generally represents a portion of the fabric layer 902 that is adhered to the internal components 506 of the input device 104. The fourth adhesive zone 910, for instance, is defined on its edges by the first adhesive zone 904 and the third adhesive zone 908. Generally, adhesive thickness in the fourth adhesive zone 910 is thinner than that of the first adhesive zone 904 and may be approximately equal to that of the second adhesive zone 906 and/or the third adhesive zone 908.

In at least some implementations, the adhesive thickness applied to the adhesive zone 904 is at least twice the thickness of the adhesive applied to the other adhesive zones. For instance, adhesive thickness applied to the adhesive zone 904 is 0.002 inches+/−0.0001 inches, whereas adhesive thickness applied to each of the adhesive zones 906, 908 is 0.001 inches+/−0.0001. Accordingly, when two fabric layers configured according to the fabric layer 902 are laminated to one another, a combined adhesive thickness at the adhesive zone 904 of 0.004 inches+/−0.0002 inches is achieved, and adhesive thickness at each of the adhesive zones 906, 908 is 0.002 inches+/−0.0001 inches.

Alternatively, adhesive may be applied to one fabric layer and not to another. Thus, two fabric layers may be adhered together via adhesive applied to adhesive zones of only one of the fabric layers. In such a case, the example adhesive thickness provided above may be doubled on the single fabric layer.

These dimensions are provided for purpose of example only, and is to be appreciated that a variety of different adhesive thicknesses may be employed at the different adhesive zones in accordance with the disclosed implementations.

According to various implementations, the top fabric layer 502 and the bottom fabric layer 504 can be implemented as the fabric layer 902. Thus, assembly of the top fabric layer 502 and the bottom fabric layer 504 to other components of the input device 104 includes lamination of the fabric layers utilizing the adhesive zones specified for the fabric layer 902. For instance, consider the following implementation scenario.

FIG. 10a illustrates an example implementation scenario 1000 for assembling various portions of the input device 104. The perspectives presented in the scenario 1000 represent a side cross section of components of the input device 104.

The upper portion of the scenario 1000 illustrates the upper fabric layer 502, the lower fabric layer 504, the internal components 506 connected to the connector 404 via the electrical connection 702, and the spine 410. Generally, the upper portion of the scenario 1000 represents various components of the input device 104 prior to assembly.

Defined on an inside surface 1002 of the upper fabric layer 502 are several adhesive zones where adhesive is applied, including an adhesive zone 1004a, an adhesive zone 1006a, an adhesive zone 1008a, and an adhesive zone 1010a. According to one or more implementations, these adhesive zones generally represent implementations of the adhesive zones introduced with reference to FIG. 9. For instance, the adhesive zone 1004a represents the adhesive zone 904, the adhesive zone 1006a represents the adhesive zone 906, the adhesive zone 1008a represents the adhesive zone 908, and the adhesive zone 1010a represents the adhesive zone 910.

Similarly to the top fabric layer 502, defined on an inside surface 1012 of the lower fabric layer 504 are several adhesive zones where adhesive is applied, including an adhesive zone 1004b, an adhesive zone 1006b, an adhesive zone 1008b, and an adhesive zone 1010b. According to one or more implementations, these adhesive zones generally represent implementations of the adhesive zones introduced with reference to FIG. 9. For instance, the adhesive zone 1004b represents the adhesive zone 904, the adhesive zone 1006b represents the adhesive zone 906, the adhesive zone 1008b represents the adhesive zone 908, and the adhesive zone 1010b represents the adhesive zone 910.

As referenced above, adhesive thickness and/or adhesive types are varied among the different adhesive zones. For instance, adhesive applied to the adhesive zones 1004a, 1004b is thicker than adhesive applied to the other adhesive zones. Alternatively or additionally, an adhesive type applied to the adhesive zones 1004a, 1004b is different than an adhesive type applied to the other adhesive zones. For instance, a heat activated film is utilized for the adhesive zones 1004a, 1004b, whereas another type of adhesive is utilized for the other adhesive zones. For instance, other adhesive zones may utilize a spray adhesive, a pressure sensitive adhesive, a contact adhesive, and so forth.

Proceeding to the lower portion of the scenario 1000, the top fabric layer 502 and the bottom fabric layer 504 are laminated to other components of the input device 104 and to one another. For instance, the top fabric layer 502 and the bottom fabric layer 504 are laminated to the internal components 506 via adhesion of the adhesive zones 1010a, 1010b to different respective sides of internal components 506. The adhesive zones 1004a, 1004b are laminated to one another to form the peripheral edge 402.

Further, the adhesive zones 1006a, 1006b are laminated to the electrical connection 702 and to one another to form the first hinge region 406 of the flexible hinge 106. In at least some implementations, the electrical connection 702 is does not span the entire width of the first hinge region 406. For instance, the electrical connection 702 is implemented across a portion and/or multiple sub-portions of the first hinge region 406. Thus, adhesion of the adhesive zones 1006a, 1006b adheres the top fabric layer 502 and the bottom fabric layer 504 to the electrical connection 702 at some regions of the first hinge region 406, and to one another at other regions of the first hinge region 406.

Similarly, the adhesive zones 1008a, 1008b are laminated to the electrical connection 702 and to one another to form the second hinge region 408 of the flexible hinge 106. In at least some implementations, the electrical connection 702 is does not span the entire width of the second hinge region 408. For instance, the electrical connection 702 is implemented across a portion and/or multiple sub-portions of the second hinge region 408. Thus, adhesion of the adhesive zones 1008a, 1008b adheres the top fabric layer 502 and the bottom fabric layer 504 to the electrical connection 702 at some regions of the second hinge region 408, and to one another at other regions of the second hinge region 408.

Although an adhesive zone is not expressly identified for the spine 410, it is to be appreciated that the top fabric layer 502 and the bottom fabric layer 504 are also laminated to the spine 410. For instance, in at least some implementations the adhesive zones 1008a, 1008b of the top fabric layer 502 are contiguous to one another and thus their adjacent edges are adhered to the spine 410. A similar situation may apply for the adhesive zones 1008a, 1008b to adhere the bottom fabric layer 504 to the spine 410.

Accordingly, the scenario 1000 illustrates that different adhesive zones may be utilized with different thickness and/or types of adhesives to achieve different material properties. For instance, utilizing a thicker and/or more durable adhesive for the adhesive zones 1004a, 1004b increases the durability of the peripheral edge 402 to mitigate delamination and/or peeling of the top fabric layer 502 and/or the bottom fabric layer 504 along the peripheral edge 402. Further, utilizing a thinner and/or more flexible adhesive layer along the adhesive zones 1006a, 1006b and/or the adhesive zones 1008a, 1008b increases flexibility of the flexible hinge.

In at least some implementations, the fabric layers 502, 504 are not removable once laminated to the input device 104, and thus are different and distinct from a removable cover. Thus, techniques discussed herein provide an integrated apparatus including a fabric layer laminated to one or more outer surfaces of the apparatus. This provides a variety of benefits over a removable cover, including those of a low profile fabric layer that is lighter than a typical removable cover.

Figure 10B:
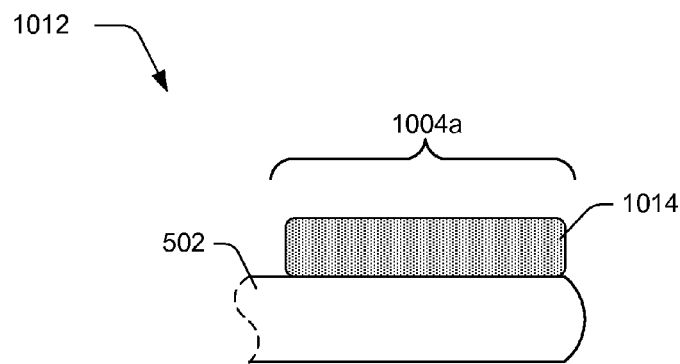
FIG. 10b depicts a view of a fabric layer with an adhesive layer in accordance with one or more embodiments.

FIG. 10b illustrates a magnified partial view 1012 of the upper fabric layer 502 including the adhesive zone 1004a. The adhesive zone 1004a includes an adhesive layer 1014 that has a particular thickness, e.g., adhesive height relative to the surface of the upper fabric layer 502. For instance, consider that the adhesive layer 1014 is formed from a heat activated film. In such an implementation, the heat activated film has a particular height at determined normal (e.g., 90 degrees) to the surface of the upper fabric layer 502.

Figure 10C:
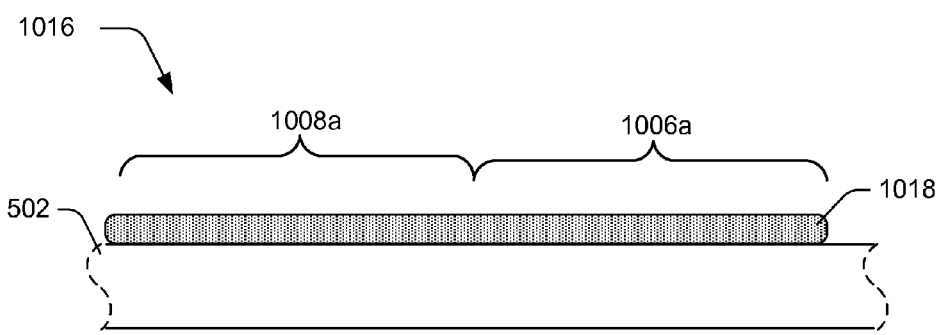
FIG. 10c depicts a view of a fabric layer with an adhesive layer in accordance with one or more embodiments.

FIG. 10c illustrates a magnified partial view 1016 of the upper fabric layer 502 including the adhesive zones 1006a, 1008a. The adhesive zones 1006a, 1008a include an adhesive layer 1018 that has a particular thickness, e.g., adhesive height relative to the surface of the upper fabric layer 502. For instance, consider that the adhesive layer 1018 is formed from a heat activated film. In such an implementation, the heat activated film has a particular height at determined normal (e.g., 90 degrees) to the surface of the upper fabric layer 502.

Notice that in comparing the thickness of the adhesive layer 1014 in FIG. 10b to the thickness of the adhesive layer 1018 in FIG. 10c, the adhesive layer 1014 is thicker. As discussed elsewhere herein, providing a thicker adhesive layer at the adhesive zone 1004a provides for increased durability at the peripheral edge of a fabric layer, e.g., at the peripheral edge 402 of the input device 402.

While the adhesive thickness at the adhesive zones 1006a, 1008a are shown as being the same, it is to be appreciated that in at least some implementations, adhesive thickness in the adhesive zones 1006a, 1008a may differ from one another. According to one or more implementations, the adhesive properties described in FIGS. 10b, 10c with reference to the top fabric layer 502 equally apply to the bottom fabric layer 504.

Figure 11:
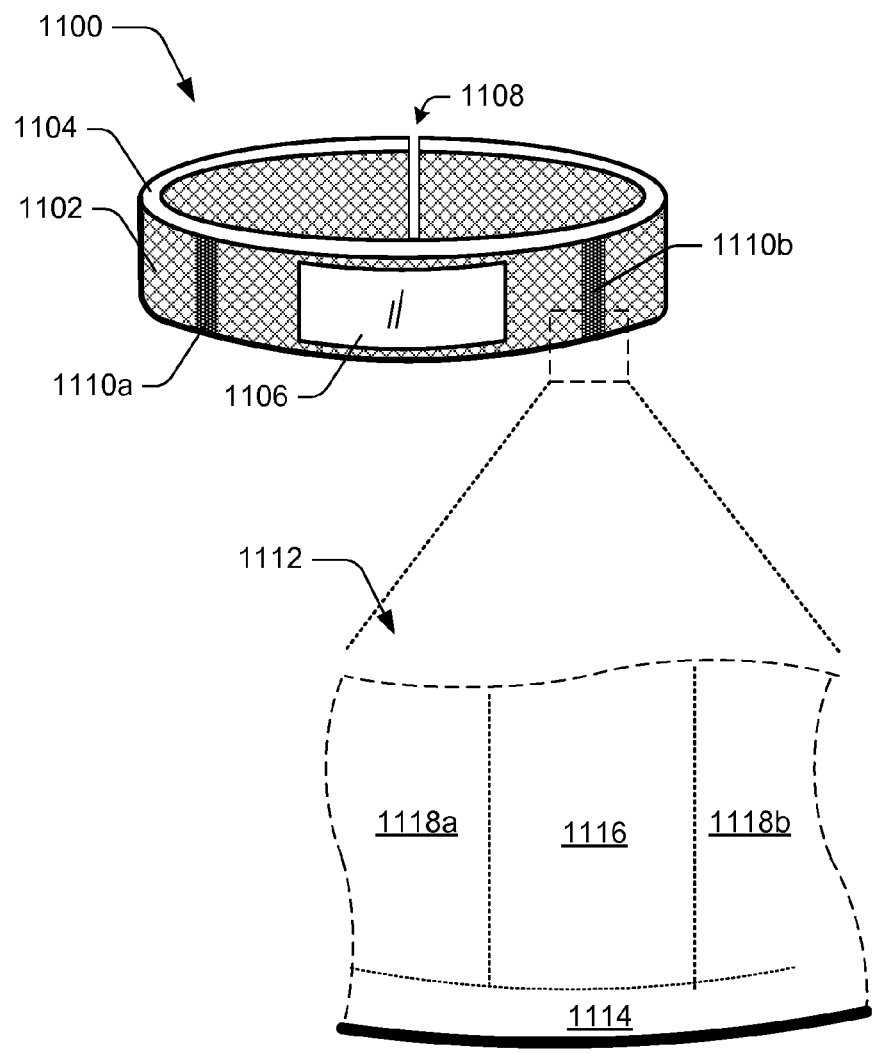
FIG. 11 depicts an example wearable device in accordance with one or more embodiments.

FIG. 11 illustrates an example wearable device 1100 according to one or more implementations. The wearable device 1100 is laminated with a fabric layer 1102 on one or more exterior surfaces of a chassis 1104, and includes a display 1106 on its outer surface. The fabric layer 1102 may be implemented in various ways, such as described above with reference to other fabric layers.

The wearable device 1100 includes a gap 1108 and is configured to flex at a flexible region 1110a and a flexible region 1110b. For instance, flexing at the flexible regions 1110a, 1110b enables the gap 1108 to expand such that the wearable device 1100 can be placed around a user's wrist.

Further illustrated in FIG. 11 is a partial view 1112 of a bottom surface of the fabric layer 1102 at the flexible region 1110b. As illustrated in the partial view 1112, the fabric layer 1102 is divided into several different adhesive zones. For instance, an adhesive zone 1114 represents a portion of the fabric layer 1102 that extends along a peripheral edge of the wearable device 1100. Further, an adhesive zone 1116 represents a portion of the fabric layer 1102 that overlays the flexible region 1110b. An adhesive zone 1118a and adhesive zone 1118b represent portions of the fabric layer 1102 that occur adjacent to the flexible region 1110b.

According to various implementations, adhesive thickness and/or adhesive type can be varied among the different adhesive zones. For instance, adhesive thickness at the adhesive zone 1114 is thicker than other adhesive zones, such as to increase durability of the fabric layer 1102 along the peripheral edge of the wearable device 1100, and to mitigate peeling and delamination of the fabric layer 1102. Adhesive thickness at the adhesive zone 1116 is thinner than adhesive thickness at other adhesive zones, such as to allow flexibility at the flexible region 1110b. Adhesive thickness at the adhesive zones 1118a, 1118b may be thinner than adhesive thickness at the adhesive zone 1114, and/or thicker than adhesive thickness at the adhesive zone 1116. While this adhesive zone profile is discussed with reference to the flexible region 1110b, a similar adhesive zone profile may apply for the flexible region 1110a.

According to one or more implementations, the fabric layer 1102 is implemented as a single continuous layer of fabric and/or multiple continuous layers of fabric layered on one another. Thus, implementations discussed herein provide for multiple different adhesive zones on a single piece of fabric to provide different characteristics to different regions of the single piece of fabric.

Although the wearable device 1100 is illustrated as a wrist watch form factor, it is to be appreciated that implementations for fabric adhesion to an apparatus described herein apply to a wide variety of different form factors, wearable and otherwise.

While implementations are discussed with reference to electronic device scenarios, it is to be appreciated that techniques for fabric adhesion to an apparatus discussed herein may be employed in a variety of different usage scenarios for any item laminated with fabric and is not limited to electronic device scenarios.

Having discussed some example implementations for fabric adhesion to an apparatus, consider now an example procedure in accordance with one or more implementations.

Example Procedure

This section describes an example procedure for fabric adhesion to an apparatus in accordance with one or more implementations. The procedure is shown as a set of operations (or acts) performed, such as through one or more computing devices and/or modules, and are not necessarily limited to the order shown for performing the operations. The example procedure may be employed in the environment 100 of FIG. 1, the system 1300 of FIG. 13, and/or any other suitable environment. According to one or more implementations, the procedure describes an example way for performing various aspects of the example implementation scenarios described herein. In at least some implementations, steps described for the procedure are implemented automatically and independent of user interaction.

Figure 12:
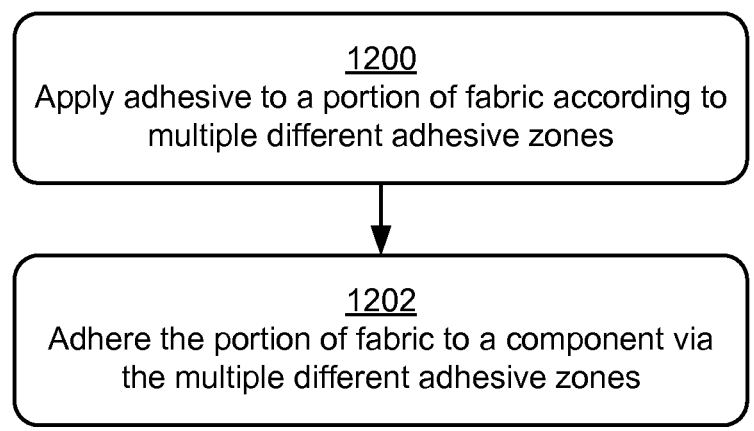
FIG. 12 is a flow diagram that describes steps in a method for laminating a fabric layer with multiple adhesive zones in accordance with one or more embodiments.

FIG. 12 is a flow diagram that describes steps in a method in accordance with one or more embodiments. The method, for instance, describes an example procedure for laminating a fabric layer with multiple adhesive zones in accordance with one or more embodiments.

Step 1200 applies adhesive to a portion of fabric according to multiple different adhesive zones. The portion of fabric, for instance, represents a single portion of fabric. Generally, the different adhesive zones differ from one another with regard to their respective adhesive thicknesses and/or their respective adhesive types.

Step 1202 adheres the portion of fabric to a component via the multiple different adhesive zones. Generally, the component may include one or more components, such as another fabric layer, an internal component of an apparatus (e.g., the internal components 506 of the input device 104), a structural component of an apparatus, and so forth. According to various implementations, the multiple different adhesive zones result in different material characteristics for the portion of fabric at the different adhesive zones, such for achieving differences in durability, flexibility, visual appearance, and so forth.

Having discussed an example procedure for fabric adhesion to an apparatus, consider now an example system and device in accordance with one or more implementations.

Example System and Device

Figure 13:
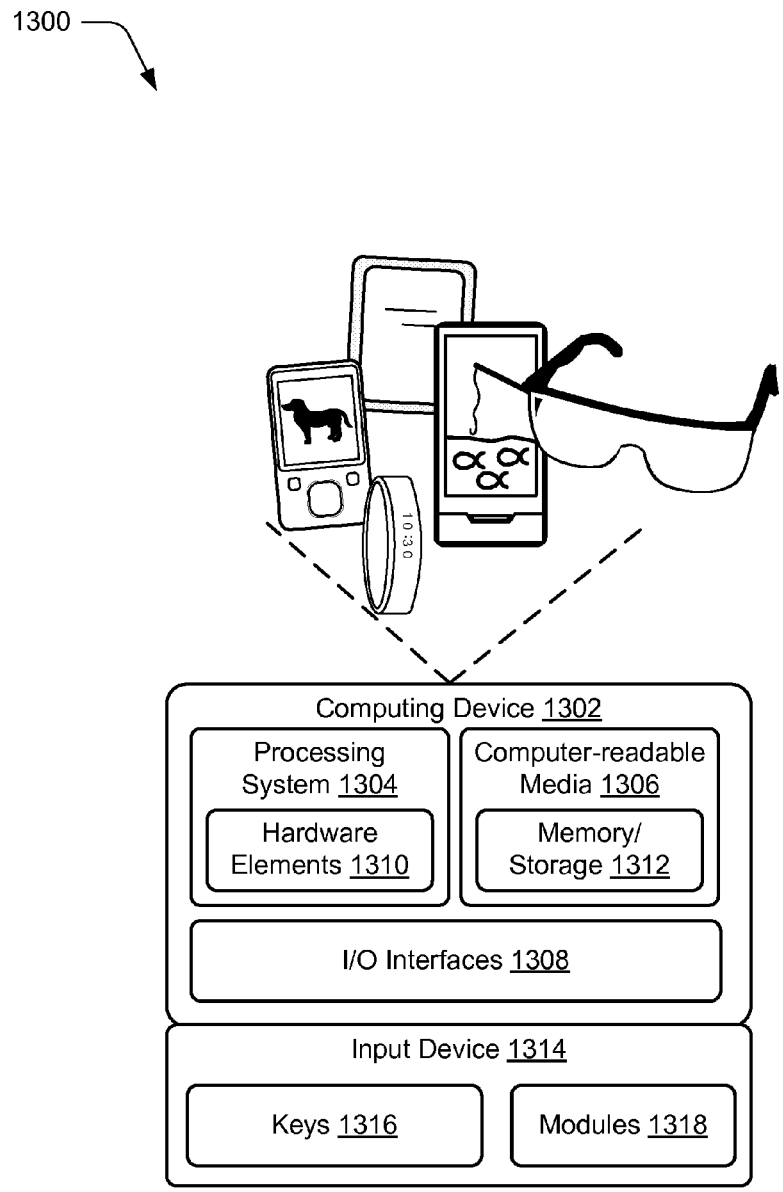
FIG. 13 illustrates an example system and device that can be employed to implement embodiments of the techniques described herein in accordance with one or more embodiments.

FIG. 13 illustrates an example system generally at 1300 that includes an example computing device 1302 that is representative of one or more computing systems and/or devices that may implement the various techniques described herein. In at least some implementations, the computing device 1302 represents an implementation of the computing device 102 discussed above. The computing device 1302 may be, for example, be configured to assume a mobile configuration through use of a housing formed and sized to be grasped and carried by one or more hands of a user, illustrated examples of which include a mobile phone, mobile game and music device, a wearable device, and tablet computer, although other examples are also contemplated.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways to support user interaction.

The computing device 1302 is further illustrated as being communicatively and physically coupled to an input device 1314 that is physically and communicatively removable from the computing device 1302. In this way, a variety of different input devices may be coupled to the computing device 1302 having a wide variety of configurations to support a wide variety of functionality. In this example, the input device 1314 includes one or more keys 1316, which may be configured as pressure sensitive keys, mechanically switched keys, and so forth.

The input device 1314 is further illustrated as include one or more modules 1318 that may be configured to support a variety of functionality. The one or more modules 1318, for instance, may be configured to process analog and/or digital signals received from the keys 1316 to determine whether a keystroke was intended, determine whether an input is indicative of resting pressure, support authentication of the input device 1314 for operation with the computing device 1302, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media does not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

Example implementations discussed herein include:

Example 1: An apparatus comprising: a computing device; an input device flexibly attached to the computing device via a flexible hinge such that the input device is rotatable to multiple orientations relative to the computing device, the input device being laminated with a fabric layer via adhesive zones that differ based on adhesive thickness at the respective adhesive zones, the adhesive zones including: a first adhesive zone that adheres a peripheral edge of the fabric layer to the input device; and a second adhesive zone that adheres the fabric layer to the flexible hinge, an adhesive thickness at the second adhesive zone being less than an adhesive thickness at the first adhesive zone.

Example 2: An apparatus as described in example 1, wherein the input device comprises a keyboard operably attached to the computing device.

Example 3: An apparatus as described one or more of examples 1 or 2, wherein the input device is detachably attached to the computing device.

Example 4: An apparatus as described one or more of examples 1-3, wherein the fabric layer comprises an integrated sheet of fabric.

Example 5: An apparatus as described one or more of examples 1-4, wherein the first adhesive zone is formed utilizing a heat activated film positioned along the peripheral edge of the fabric layer.

Example 6: An apparatus as described one or more of examples 1-5, wherein the adhesive zones include a third adhesive zone that adheres the fabric layer to one or more internal components of the input device, an adhesive thickness of the third adhesive zone being less than the adhesive thickness of the first adhesive zone.

Example 7: An apparatus as described one or more of examples 1-6, wherein an adhesive type utilized in the first adhesive zone is different than an adhesive type utilized in the second adhesive zone.

Example 8: An apparatus as described one or more of examples 1-7, wherein the fabric layer is laminated to a first side of internal components of the input device, and wherein the apparatus further comprises a different fabric layer laminated to a second side of the internal components, a peripheral edge of the different fabric layer being laminated to the peripheral edge of the fabric layer at the first adhesive zone to form a peripheral edge of the input device.

Example 9: An apparatus as described one or more of examples 1-8, wherein the fabric layer is laminated to a first side of internal components of the input device, and wherein the apparatus further comprises a different fabric layer laminated to a second side of the internal components, the different fabric layer being at least partially laminated to the fabric layer at the second adhesive zone to form at least a part of the flexible hinge.

Example 10: An input device comprising: one or more internal components; an interface connected the one or more internal components and configured to connect the input device to a computing device; a first fabric layer laminated to a first side of the one or more internal components; and a second fabric layer laminated to a second side of the one or more internal components, one or more of the first fabric layer or the second fabric layer including: a first adhesive zone that adheres a peripheral edge of the first fabric layer to a peripheral edge of the second fabric layer to form a peripheral edge of the input device; and a second adhesive zone that at least partially adheres the first fabric layer to the second fabric layer to form a flexible hinge that enables flexible attachment of the input device to the computing device, an adhesive thickness of the second adhesive zone being less than an adhesive thickness of the first adhesive zone.

Example 11: An input device as described in example 10, wherein the interface is selected from a group consisting of a wireless transceiver and an electronic connector.

Example 12: An input device as described in one or more of examples 10 or 11, wherein the first adhesive zone comprises a heat activated film that adheres the peripheral edge of the first fabric layer to the peripheral edge of the second fabric.

Example 13: An input device as described in one or more of examples 10-12, wherein the one or more of the first fabric layer or the second fabric layer comprises an integrated sheet of fabric with the first adhesive zone and the second adhesive zone thereon.

Example 14: An input device as described in one or more of examples 10-13, wherein the one or more of the first fabric layer or the second fabric layer further comprises a third adhesive zone that adheres the one or more of the first fabric layer or the second fabric layer to the one or more internal components.

Example 15: An apparatus comprising: a chassis including a flexible region; and a fabric layer laminated to the chassis via multiple adhesive zones including a first adhesive zone that laminates the fabric layer to a peripheral edge of the chassis, and a second adhesive zone that laminates the fabric layer to the flexible region, the second adhesive zone having an adhesive thickness that is thinner than an adhesive thickness of the first adhesive zone.

Example 16: An apparatus as described in example 15, wherein the apparatus comprises an input device configured to be detachably attached to a computing device.

Example 17: An apparatus as described in one or more of examples 15 or 16, wherein the apparatus comprises a wearable device.

Example 18: An apparatus as described in one or more of examples 15-17 wherein the first adhesive zone includes a heat activated film layer that is thicker than a heat activated film layer of the second adhesive zone.

Example 19: An apparatus as described in one or more of examples 15-18, wherein the first adhesive zone includes a different type of adhesive than the second adhesive zone.

Example 20: An apparatus as described in one or more of examples 15-19, wherein the fabric layer includes a third adhesive zone that laminates the fabric layer to the chassis adjacent to the flexible region.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An apparatus comprising:
   a computing device;
   an input device flexibly attached to the computing device via a flexible hinge such that the input device is rotatable to multiple orientations relative to the computing device, the input device being laminated with a fabric layer via adhesive zones that differ based on adhesive thickness and adhesive type at the respective adhesive zones, the adhesive zones including:
      a first adhesive zone that adheres a peripheral edge of the fabric layer to the input device; and
      a second adhesive zone that adheres the fabric layer to the flexible hinge, an adhesive thickness at the second adhesive zone being less than an adhesive thickness at the first adhesive zone and an adhesive type utilized in the first adhesive zone being different from an adhesive type utilized in the second adhesive zone.

2. An apparatus as recited in claim 1, wherein the input device comprises a keyboard operably attached to the computing device.

3. An apparatus as recited in claim 1, wherein the input device is detachably attached to the computing device.

4. An apparatus as recited in claim 1, wherein the fabric layer comprises an integrated sheet of fabric.

5. An apparatus as recited in claim 1, wherein the first adhesive zone is formed utilizing a heat activated film positioned along the peripheral edge of the fabric layer.

6. An apparatus as recited in claim 1, wherein the adhesive zones include a third adhesive zone that adheres the fabric layer to one or more internal components of the input device, an adhesive thickness of the third adhesive zone being less than the adhesive thickness of the first adhesive zone.

7. An apparatus as recited in claim 1, wherein the fabric layer is laminated to a first side of internal components of the input device, and wherein the apparatus further comprises a different fabric layer laminated to a second side of the internal components, a peripheral edge of the different fabric layer being laminated to the peripheral edge of the fabric layer at the first adhesive zone to form a peripheral edge of the input device.

8. An apparatus as recited in claim 1, wherein the fabric layer is laminated to a first side of internal components of the input device, and wherein the apparatus further comprises a different fabric layer laminated to a second side of the internal components, the different fabric layer being at least partially laminated to the fabric layer at the second adhesive zone to form at least a part of the flexible hinge.

9. An input device comprising:
   one or more internal components;
   an interface connected to the one or more internal components and configured to connect the input device to a computing device;
   a first fabric layer laminated to a first side of the one or more internal components; and
   a second fabric layer laminated to a second side of the one or more internal components, one or more of the first fabric layer or the second fabric layer including:
      a first adhesive zone that adheres a peripheral edge of the first fabric layer to a peripheral edge of the second fabric layer to form a peripheral edge of the input device; and
      a second adhesive zone that at least partially adheres the first fabric layer to the second fabric layer to form a flexible hinge that enables flexible attachment of the input device to the computing device, an adhesive thickness of the second adhesive zone being less than an adhesive thickness of the first adhesive zone and an adhesive type utilized in the first adhesive zone being different from an adhesive type utilized in the second adhesive zone.

10. An input device as recited in claim 9, wherein the interface is selected from a group consisting of a wireless transceiver and an electronic connector.

11. An input device as recited in claim 9, wherein the first adhesive zone comprises a heat activated film that adheres the peripheral edge of the first fabric layer to the peripheral edge of the second fabric.

12. An input device as recited in claim 9, wherein the one or more of the first fabric layer or the second fabric layer comprises an integrated sheet of fabric with the first adhesive zone and the second adhesive zone thereon.

13. An input device as recited in claim 9, wherein the one or more of the first fabric layer or the second fabric layer further comprises a third adhesive zone that adheres the one or more of the first fabric layer or the second fabric layer to the one or more internal components.

14. An apparatus comprising:
a chassis including a flexible region; and
a fabric layer laminated to the chassis via multiple adhesive zones including a first adhesive zone that laminates the fabric layer to a peripheral edge of the chassis, and a second adhesive zone that laminates the fabric layer to the flexible region, the second adhesive zone having an adhesive thickness that is thinner than an adhesive thickness of the first adhesive zone and an adhesive type utilized in the first adhesive zone being different from an adhesive type utilized in the second adhesive zone.

15. An apparatus as described in claim 14, wherein the apparatus comprises an input device configured to be detachably attached to a computing device.

16. An apparatus as described in claim 14, wherein the apparatus comprises a wearable device.

17. An apparatus as described in claim 14, wherein the first adhesive zone includes a heat activated film layer positioned along the peripheral edge of the fabric layer.

18. An apparatus as described in claim 14, wherein the fabric layer includes a third adhesive zone that laminates the fabric layer to the chassis adjacent to the flexible region.

19. An apparatus as recited in claim 1, wherein the second adhesive zone is formed utilizing one or more of a spray adhesive, a pressure sensitive adhesive, and a contact adhesive.

20. An apparatus as described in claim 14, wherein the first adhesive zone includes adhesive applied to both the fabric layer and the peripheral edge of the chassis.

* * * * *